(12) United States Patent
Pawlanta et al.

(10) Patent No.: US 7,499,164 B2
(45) Date of Patent: Mar. 3, 2009

(54) SYSTEMS AND METHODS FOR PROFILING AND SYNCHRONIZING A FLEET OF COLOR MEASUREMENT INSTRUMENTS

(75) Inventors: Brett Allen Pawlanta, Grand Rapids, MI (US); James W. Vogh, Methuen, MA (US); Thomas W. Michaels, Grand Rapids, MI (US); Kraig D. Spear, Grand Rapids, MI (US); Timothy L. Walker, West Olive, MI (US)

(73) Assignee: X-Rite, Inc., Grand Rapids, MI (US)

( * ) Notice: Subject to any disclaimer, the term of this patent is extended or adjusted under 35 U.S.C. 154(b) by 323 days.

(21) Appl. No.: 11/450,993

(22) Filed: Jun. 12, 2006

(65) Prior Publication Data

US 2007/0002324 A1 Jan. 4, 2007

Related U.S. Application Data

(60) Provisional application No. 60/699,476, filed on Jul. 15, 2005, provisional application No. 60/689,656, filed on Jun. 10, 2005.

(51) Int. Cl.
*G01J 3/46* (2006.01)

(52) U.S. Cl. .......... 356/402; 356/425; 356/319

(58) Field of Classification Search .......... 356/402, 356/425, 319, 320; 358/1.9, 504, 518
See application file for complete search history.

(56) References Cited

U.S. PATENT DOCUMENTS

| 6,043,894 | A | 3/2000 | Van Aken et al. |
| 6,559,944 | B1 * | 5/2003 | Van Aken et al. ........... 356/425 |
| 7,233,398 | B2 * | 6/2007 | Kitazawa .................... 356/402 |
| 2003/0053134 | A1 * | 3/2003 | Haro ........................ 358/2.1 |
| 2004/0239935 | A1 | 12/2004 | Kitazawa |

OTHER PUBLICATIONS

Rich, Danny C., "Graphic technology—Improving the inter-instrument agreement of spectrocolorimeters", A White Paper made available by the Committee for Graphic Arts Technologies Standards (CGATS), Jan. 2004.

* cited by examiner

*Primary Examiner*—L. G Lauchman
(74) *Attorney, Agent, or Firm*—McCarter & English, LLP

(57) ABSTRACT

A method for adjusting a color measurement of a secondary color measurement instrument. The method includes generating a profile for the secondary color measurement instrument based on color measurements of a master color measurement instrument, and applying the profile to adjust the color measurement of the secondary color measurement instrument.

14 Claims, 14 Drawing Sheets

Example of a color set and a master profile created from two different vendors instruments.

Example of unprofiled (red blob) vs. profiled (green blob) data points for the instruments in the above example.

Example of 37 random samples measured on both the master instrument and the secondary instrument. The red bars represent the unprofiled results and the green bars represent the profiled results.

SYSTEMS AND METHODS FOR PROFILING AND SYNCHRONIZING A FLEET OF COLOR MEASUREMENT INSTRUMENTS

CROSS-REFERENCE TO RELATED APPLICATIONS

This application claims the priority benefit of U.S. Provisional Patent Application No. 60/689,656 filed Jun. 10, 2005 and U.S. Provisional Patent Application No. 60/699,476 filed on Jul. 15, 2005, the disclosures of which are incorporated herein by reference in their entirety.

TECHNICAL FIELD OF THE INVENTION

This application is directed generally and in various embodiments to systems and methods for profiling and synchronizing a fleet of color measurement instruments.

BACKGROUND

As color communication becomes more prevalent on the Internet and through other electronic mediums, users expect to share electronic color data throughout the supply chain. Companies are relying less on physical samples and more on color measurement data taken with their fleets of instruments. Unfortunately, the performance of a color measurement instrument, such as a spectrophotometer, varies over time due to the age of internal components and the environment in which the instrument is used. Further complicating the management of data to consistent and accurate standards is the reality that no two instrument manufacturers produce identical instruments. As a result, differences in color measurement occur even within a single laboratory, and the challenges are compounded throughout corporate fleets of instruments and across production supply chains. A variety of systems and methods have been developed for profiling and synchronizing color measurements across a fleet of color measurement instruments. Examples of such systems and methods are disclosed in U.S. Pat. No. 6,043,894, issued Mar. 28, 2000 to Van Aken, et al. and U.S. Published Application No. 2004/0239935, dated Dec. 2, 2004 by Kitazawa. These systems utilize both master color standards and working color standards. Consequently, these systems require that many sets of tiles be created, transported, and maintained. Accordingly, these systems are cumbersome, labor intensive, and prone to error.

SUMMARY

In one general respect, this application discloses a method for adjusting a color measurement of a secondary color measurement instrument. According to various embodiments, the method includes generating a profile for the secondary color measurement instrument based on color measurements of a master color measurement instrument, and applying the profile to adjust the color measurement of the secondary color measurement instrument. In one embodiment, applying the profile to adjust the color measurement of the secondary color measurement instrument includes applying the profile to compensate for at least one spectral difference between the master color measurement instrument and the secondary color measurement instrument.

In another general respect, this application discloses a system for adjusting a color measurement of a secondary color measurement instrument. According to various embodiments, the system includes a secondary profile generation module for generating a profile for the secondary color measurement instrument based on color measurements of a master color measurement instrument. The system further includes a secondary profile application module for applying the secondary instrument profile to adjust the color measurement of the secondary color measurement instrument.

DESCRIPTION

Figure 1:
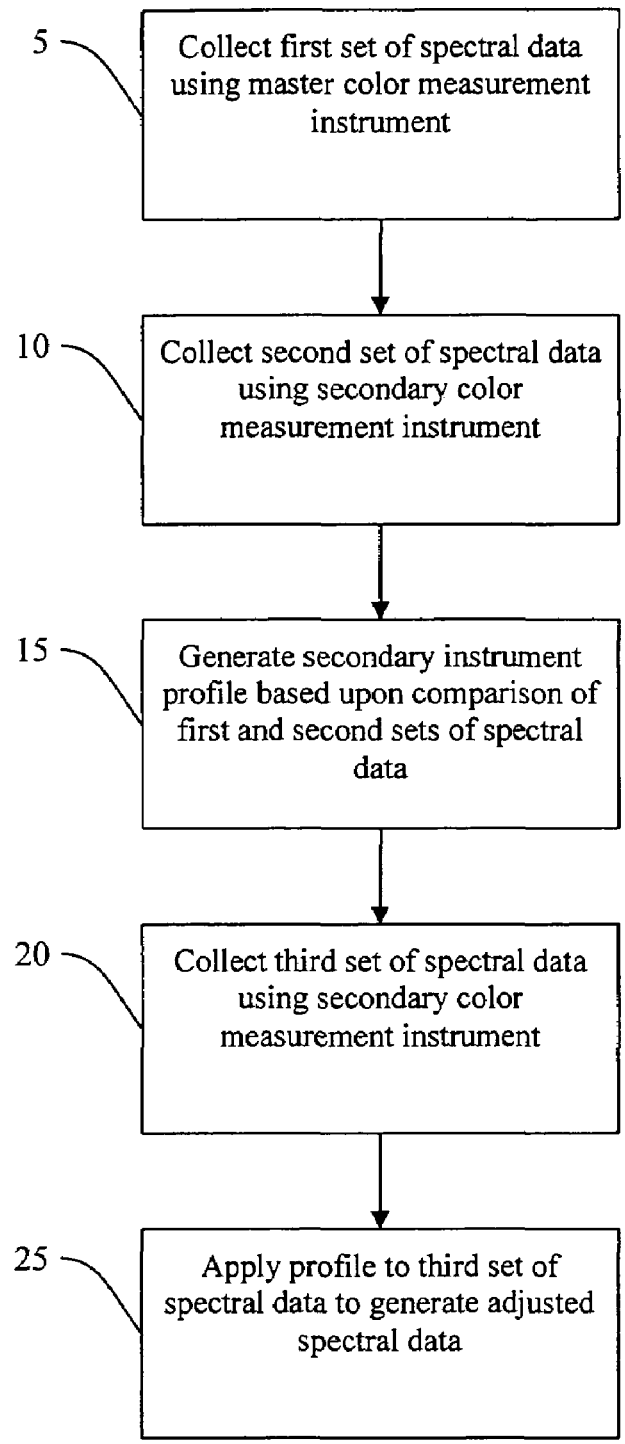
FIG. 1 is a block diagram of a method for adjusting a color measurement of a secondary color measurement instrument based upon color measurements of a master color measurement instrument according to various embodiments of the present invention.

FIG. 1 is a block diagram of a method for adjusting a color measurement of a secondary color measurement instrument 50 (FIGS. 2a-2d) based upon color measurements of a master color measurement instrument 45 (FIGS. 2a-2d) according to various embodiments of the present invention. As will be appreciated from the discussion that follows, adjusting, or "synchronizing," the color measurements of the secondary color measurement instrument 50 based upon those of the master color measurement instrument 45 reduces spectral differences between the instruments 45, 50, especially in cases where the instruments 45, 50 are of different makes or models.

According to various embodiments, each of the master and secondary color measurement instruments 45, 50 may be a conventional spectrophotometer and, together with any number of other similar instruments, define a fleet of color measurement instruments. The instrument fleet may be used, for example, by a common business enterprise (e.g., an advertising company, a textile company controlling lab dip submissions, plastics manufacturers, paint manufactures, etc. ) to control the color quality of printed and/or electronic media The instrument fleet may include instruments associated any number of manufacturers and may be distributed across any number of locations associated with the business enterprise. The master and secondary color measurement instruments 45, 50 may be of similar or different geometries. According to various embodiments, for example, the master instrument 45 may have a 0°/45° geometry, and the secondary color measurement instrument may have a δ/8° geometry. In other embodiments, for example, both the master and secondary instruments 45, 50 may have a 0°/45° or a δ/8° geometry.

Figure 2A:
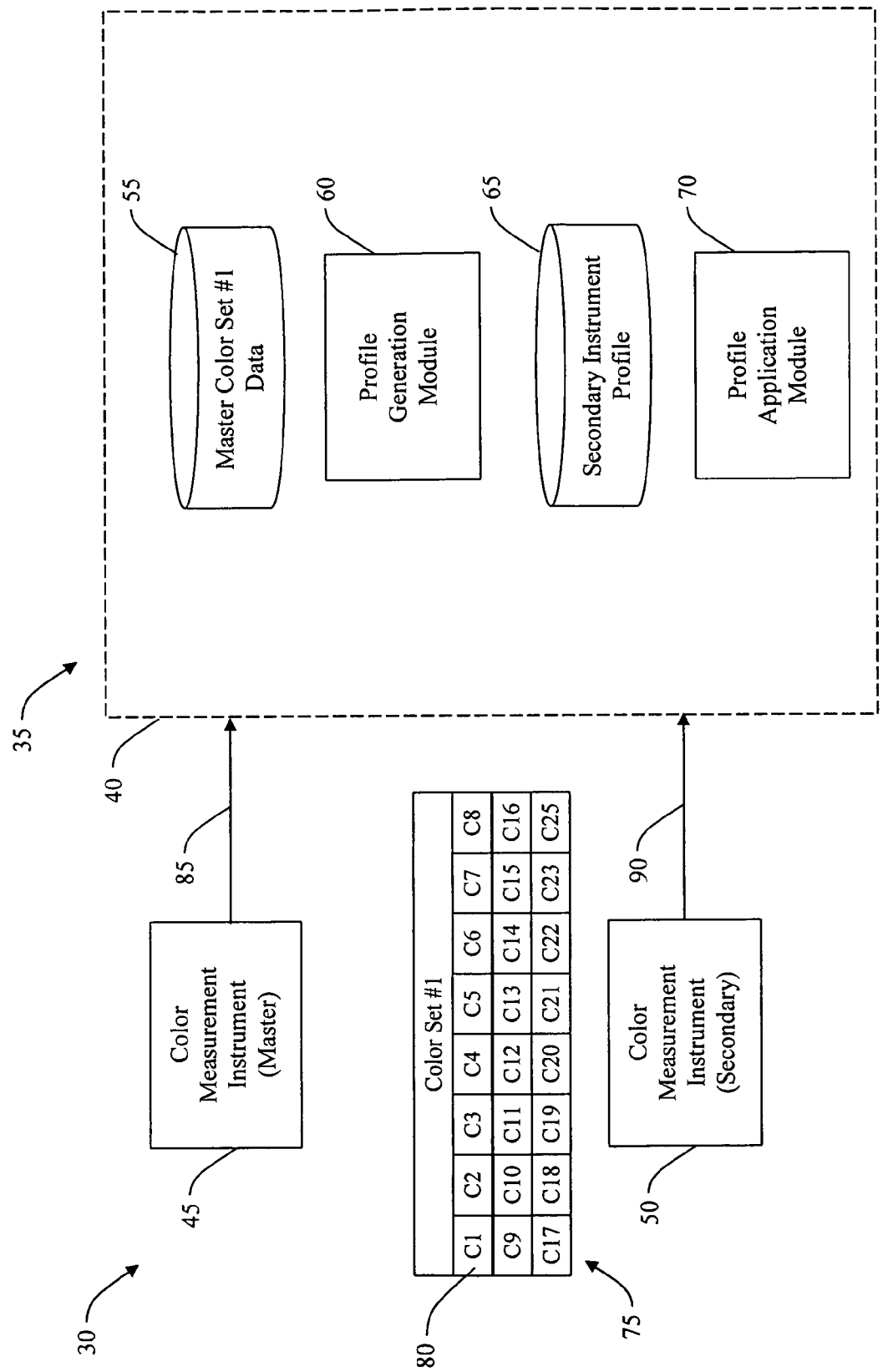
FIGS. 2a-2d are diagrams of a system for implementing the method of FIG. 1 according to various embodiments of the present invention.

FIGS. 2a-2d are diagrams of a system 30 for implementing the method of FIG. 1 according to various embodiments of the present invention. With reference to FIG. 2a, the system 30 comprises a computer system 35 including at least one computing device 40 for receiving color measurement readings from the master color measurement instrument 45 and the secondary color measurement instrument 50 (hereinafter the master instrument 45 and the secondary instrument 50). The computing device 40 may be implemented as one or more networked computers, such as personal computers, servers, etc. The computing device 40 may further include an input device (not shown), such as a keyboard, and a display (not shown), such as a computer screen or monitor, for providing a user interface. Although the computing device 40 is shown to be in simultaneous communication with the master and secondary instruments 45, 50 in FIG. 2a, it will be appreciated from the discussion that follows that communication between the computing device 40 and each instrument 40, 45 may be selectively enabled or disabled as needed in order to implement the method of FIG. 1.

According to various embodiments, the computing device 40 comprises a first data storage module 55, a profile generation module 60, a second data storage module 65, and a profile application module 70. Each module 55, 60, 65, 70 may be implemented as software code to be executed by a processor (not shown) of the computing device 40 using any suitable computer language, such as, for example, Java, C, C++, Visual Basic or Perl using, for example, conventional or object-oriented techniques. The software code may be stored as a series of instructions or commands on a computer-readable medium, such as a random access memory (RAM), a read-only memory (ROM), a magnetic medium such as a hard drive or a floppy disk, or an optical medium, such as a CD-ROM or DVD-ROM.

The system 30 further includes a color set 75 (color set #1) comprising a plurality of color samples 80. According to various embodiments, the number, color, and material properties of the color samples 80 may be selected in accordance with the requirements of a particular color measurement application in which the instruments 45, 50 are to be used. As will be appreciated from the discussion that follows, the accuracy of the adjusted color measurements generated in accordance with the method of FIG. 1 is improved as the number of color samples 80 within the color set 75 is increased. Although the number of color samples 80 may be varied depending upon application requirements, the color set 75 should comprise at least ten color samples 80, with two of the color samples being of black and white colors, respectively. In certain embodiments and as illustrated, the color set 75 may comprise twenty-five color samples 80 (C1—C25). In one embodiment, the color samples 80 may be formed from a ceramic material and represent the following colors defined in accordance with the CIELAB (L*a*b*) color scale:

| | L* | a* | b* |
|---|---|---|---|
| C1 | 25.99 | 0.12 | −0.13 |
| C2 | 93.37 | −0.27 | 2.07 |
| C3 | 62.21 | −2.24 | −15.06 |
| C4 | 74.62 | −10.34 | 32.15 |
| C5 | 37.31 | −12.03 | −2.61 |
| C6 | 56.45 | −5.14 | 14.09 |
| C7 | 61.44 | −1.6 | −1.47 |
| C8 | 33.31 | 9.6 | −4.59 |

-continued

| | L* | a* | b* |
|---|---|---|---|
| C9 | 69.6 | 15.04 | 51.38 |
| C10 | 34.28 | 2.93 | −19.71 |
| C11 | 75.38 | −4.04 | 6.61 |
| C12 | 37.09 | 19.47 | 6.1 |
| C13 | 85.53 | 1.96 | 61.96 |
| C14 | 37.06 | −11.41 | 4.72 |
| C15 | 64.75 | 4.01 | 7.34 |
| C16 | 38.29 | 3.12 | 10.51 |
| C17 | 51.08 | 6.92 | −7.78 |
| C18 | 50.71 | −15.69 | −0.48 |
| C19 | 82.81 | 1.37 | 8.34 |
| C20 | 43.55 | −8.39 | 3.95 |
| C21 | 29.57 | −0.04 | −5.87 |
| C22 | 41.83 | 49.85 | 24.54 |
| C23 | 25.5 | 9.26 | −17.26 |
| C24 | 81.26 | 16.48 | 89.52 |
| C25 | 60.61 | 56.02 | 56.5 |

It will be appreciated that materials other than ceramic materials (e.g., textile, paper, paint, etc.) as well as other color schemes may alternatively be used depending upon application requirements.

Figure 2B:
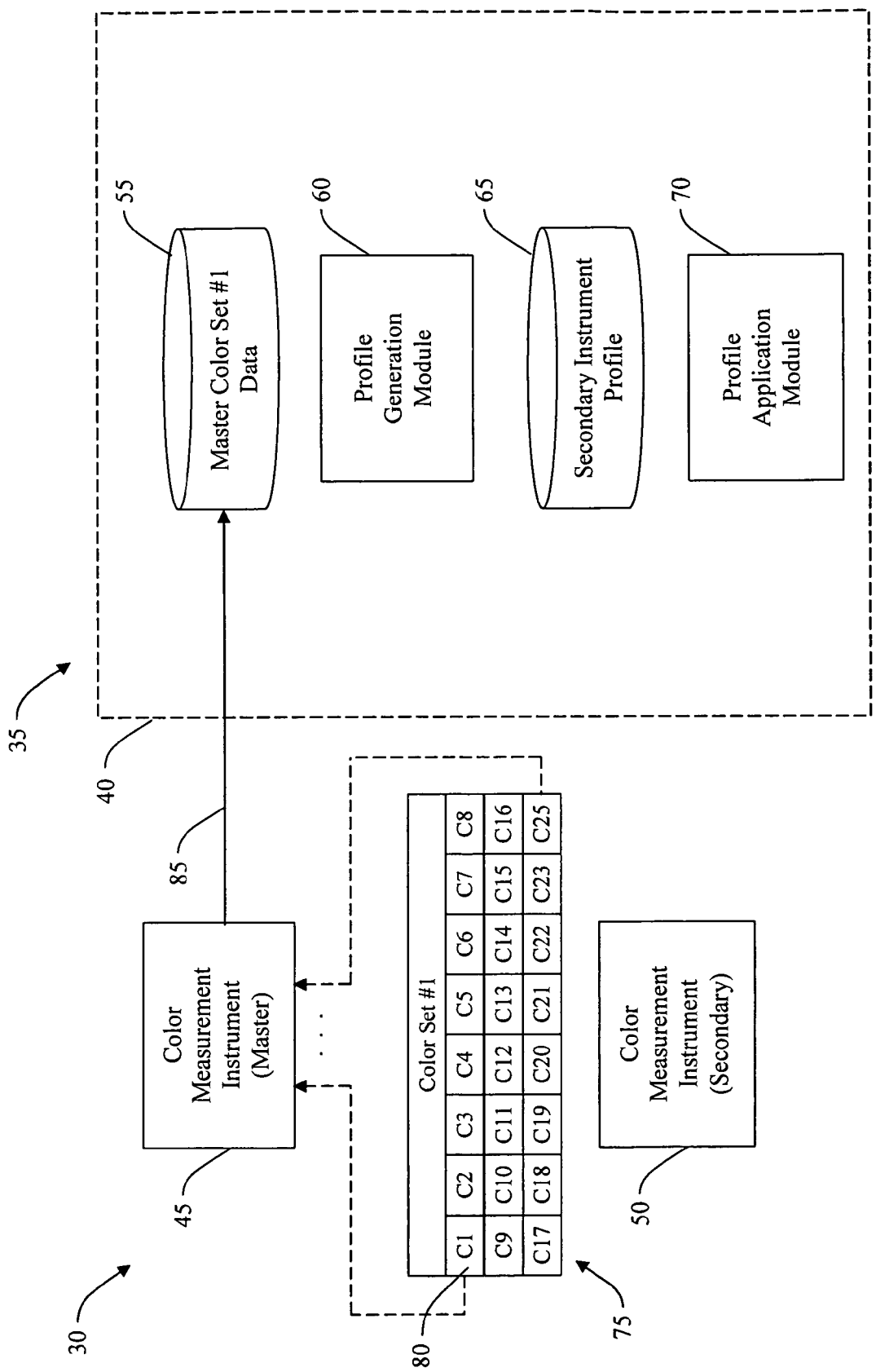

Referring again to FIG. 1, a first set of spectral data is collected based on color measurements of the color samples 80 by the master instrument 45 at step 5. The spectral data may comprise, for example, a plurality of reflectance values for each color sample 80 based on reflectance measurements of the color sample 80 at a corresponding plurality of illumination wavelengths. As shown in FIG. 2b, the first set of spectral data may be communicated from the master instrument 45 to the first data storage module 55 via a communication link 85 and stored therein as master color set #1 data. The communication link 85 may be, for example, a USB communication link or any other suitable communication link supported by the master instrument 45 and the computing device 40 for enabling the transfer of spectral data therebetween. According to various embodiments, the color measurements of step 5 may be performed manually and in a sequential fashion by a user of the system 30. According to such embodiments, the computing device 40 may provide an indication to the user (e.g., a display prompt) when each color sample 80 is to be measured.

Figure 2C:
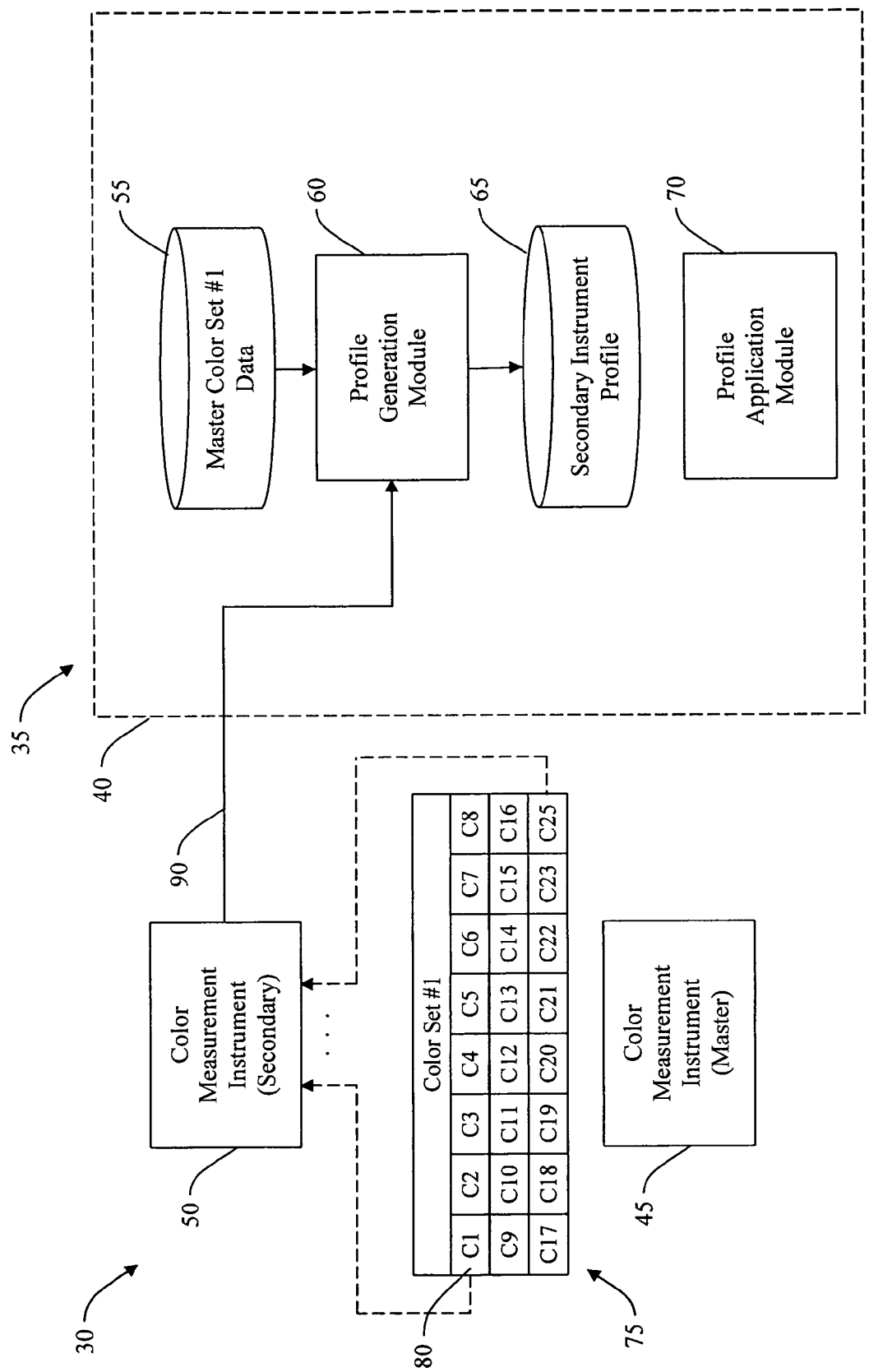

At step 10 of FIG. 1, a second set of spectral data is collected based on color measurements of the color samples 80 by the secondary instrument 50 in a manner analogous to that described above at step 5. As shown in FIG. 2c, the second set of spectral data may be communicated from the secondary instrument 50 to the profile generation module 60 via a communication link 90 similar to the communication link 85.

At step 15 of FIG. 1 and as shown in FIG. 2c, the profile generation module 60 receives the first set of spectral data (master color set #1 data) from the first data storage module 55 and generates a profile for the secondary instrument 50 based on a comparison of the first and second sets of spectral data. According to various embodiments, the profile generation module 60 may generate the profile using any suitable mathematical model for representing differences between the first and second sets of spectral data. An example of one such model is disclosed by D. C. Rich, *White Paper, Graphic technology—Improving the inter-instrument agreement of spectrocolorimeters*, Committee for Graphic Arts Technologies Standards (2004). The model disclosed by Rich is of the form:

$$R_o(\lambda) = \beta_0 + \beta_1 * R_t(\lambda) + \beta_2 * \frac{dR_t(\lambda)}{d\lambda} + \beta_3 * \frac{d^2 R_t(\lambda)}{d\lambda^2},$$

where $R_o(\lambda)$ and $R_t(\lambda)$ represent the reflectance values measured by the master instrument 45 and the secondary instrument 50 at each illumination wavelength, respectively, and the terms $\beta_0$, $\beta_1$, $\beta_2$, and $\beta_3$ represent the difference in zero offset, the difference in linear scaling between black and white colors, the linear difference in the wavelength scale, and the difference in the bandwidth, respectively, between the master instrument 45 and the secondary instrument 50. For each wavelength at which the color samples 80 are measured, the resulting reflectance values may be processed by the profile generation module 60 using known regression analysis techniques to determine average estimated values for $\beta_0$, $\beta_1$, $\beta_2$, and $\beta_3$. As discussed below in connection with step 25, spectral data subsequently collected by the secondary instrument 50 may thus be adjusted by substituting into the model the reflectance value measured at each illumination wavelength, along with the corresponding values of $\beta_0$, $\beta_1$, $\beta_2$, and $\beta_3$, and then computing a corresponding adjusted reflectance value. In this way, spectral data collected by the secondary instrument 50 may be corrected to compensate for certain spectral differences between the master and secondary instruments 45, 50. Adjustment of spectral data collected by the secondary instrument 50 in this fashion thus synchronizes the color measurements of the secondary instrument 50 with those of the master instrument 45. As further shown in FIG. 2c, the secondary instrument profile may be communicated to the second data storage module 65 for storage therein.

Figure 2D:
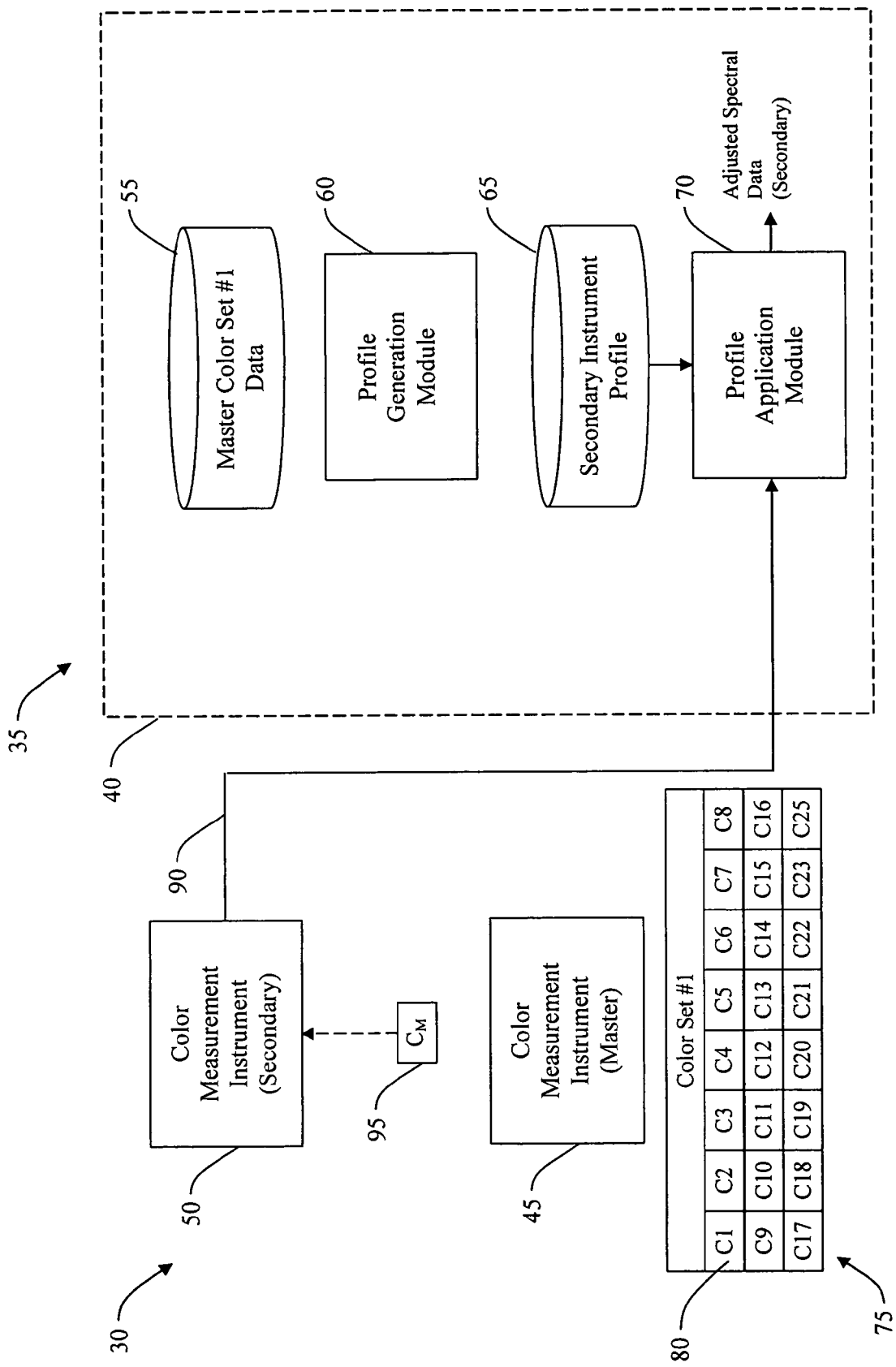

At step 20 of FIG. 1 and as shown in FIG. 2d, a third set of spectral data is collected based on a color measurement of a color sample 95 ($C_M$) by the secondary instrument 50. The third set of spectral data may be collected, for example, during normal use of the secondary instrument 50. As further shown in FIG. 2d, the third set of spectral data may be communicated to the profile application module 70 via the communication link 90.

At step 25 of FIG. 1 and as shown in FIG. 2d, the profile application module 70 receives the secondary instrument profile from the second data storage module 65 and applies the profile to the third set of spectral data to generate an adjusted set of spectral data. As described above in connection with step 60, application of the secondary instrument profile to the third set of spectral data may entail substitution of a reflectance value and computed values of $\beta_0$, $\beta_1$, $\beta_2$, and $\beta_3$ into the profile for each illumination wavelength. The resulting adjusted spectral data may then be mapped onto a suitable color scale such as, for example, the CIELAB color scale, and then output by the computing device 40.

Figure 3:
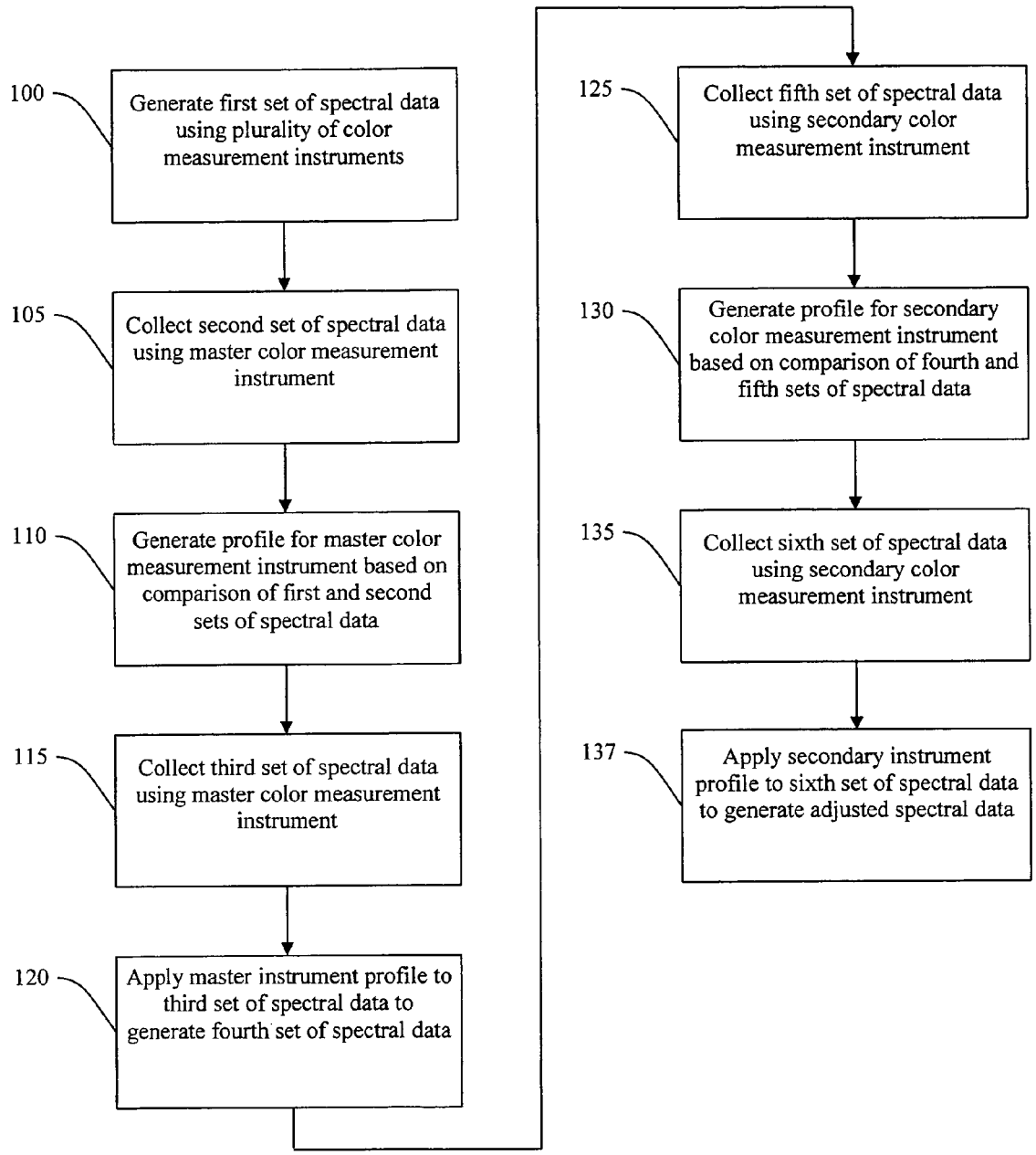
FIG. 3 is a block diagram of a method for adjusting a color measurement of a secondary color measurement instrument based upon color measurements of a master color measurement instrument according to various embodiments of the present invention.
Figure 4A:
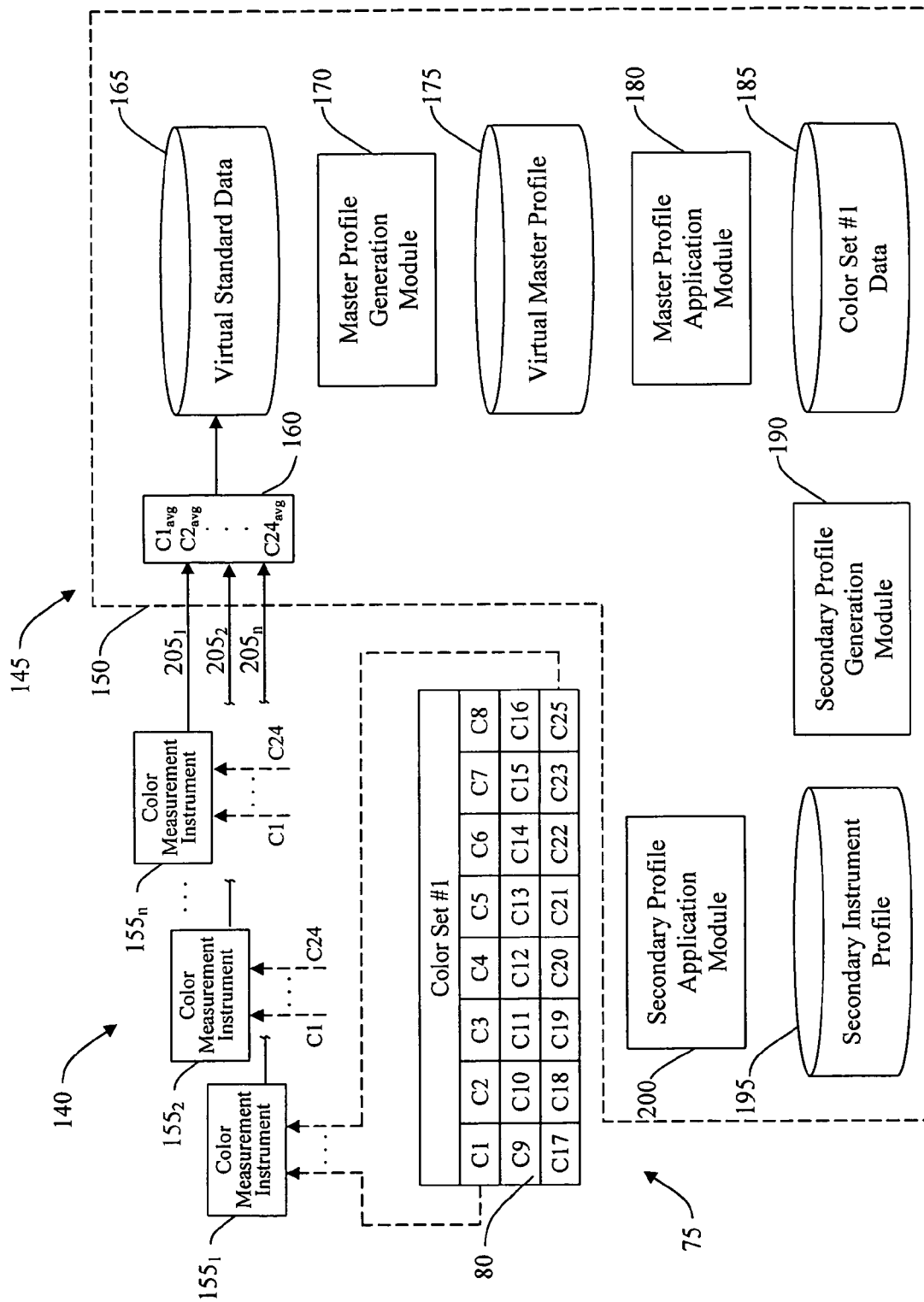
FIGS. 4a-4e are diagrams of a system for implementing the method of FIG. 3 according to various embodiments of the present invention.

FIG. 3 is a block diagram of a method for adjusting a color measurement of a secondary color measurement instrument based upon color measurements of a master color measurement instrument according to various embodiments of the present invention. FIGS. 4a-4e are diagrams of a system 140 for implementing the method of FIG. 3 according to various embodiments of the present invention. With reference to FIG. 4a, the system 140 comprises a computer system 145 including a computing device 150 for receiving color measurements from a plurality of color measurement instruments $155_1$-$155_n$. The computing device 150 may be similar to the computing device 40 described above in connection with FIG. 2a-2d and may be implemented as one or more networked computers having an input device (not shown) and a display (not shown) associated therewith.

According to various embodiments, the computing device 150 comprises a data averaging module 160, a first data storage module 165, a master profile generation module 170, a second data storage module 175, a master profile application module 180, a third data storage module 185, a secondary profile generation module 190, a fourth data storage module 195, and a secondary profile application module 200. Each module 160-200 may be implemented as software code to be executed by a processor (not shown) in a manner analogous to that described above with respect to the modules 55, 60, 65, 70 of FIGS. 2a-2d. The system 140 may further include a color set 75 comprising a plurality of color samples 80 as described above.

With reference to FIG. 3, a first set of spectral data is generated based on color measurements of the color samples 80 by each color measurement instrument $155_1$-$155_n$ at step 100. In particular, as shown in FIG. 4a, spectral data collected by the instruments $155_1$-$155_n$ (e.g., reflectance values corresponding to each illumination wavelength) may be communicated to the data averaging module 160 via communication links $205_1$-$205_n$. The data averaging module 160 may average the spectral data corresponding to each color sample 80. The averaged spectral data corresponds to the first set of spectral data and may be communicated to the first data storage module 165 and stored therein as virtual standard data. The first set of spectral data thus represents a composite of the spectral data separately collected by each instrument $155_1$-$155n$. In effect, the instruments $155_1$-$155_n$ collectively define a virtual master instrument. The collection of spectral data by each instrument $205_1$-$205_n$ at step 100 may be performed manually and in a sequential fashion in a manner analogous to that described above in connection with step 5 of FIG. 1.

Figure 4B:
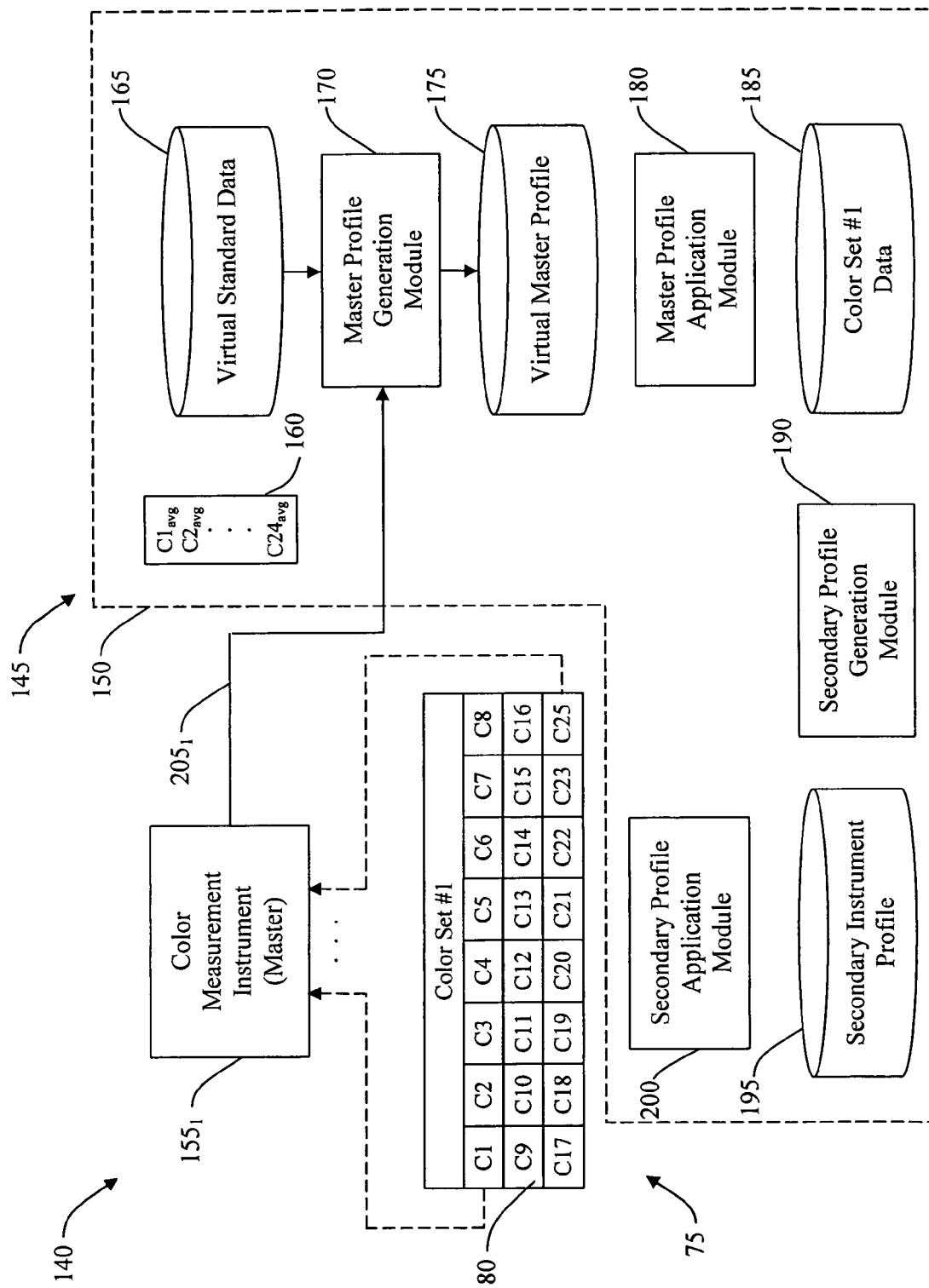

At step 105 of FIG. 3 and as shown in FIG. 4b, a second set of spectral data is collected based on color measurements of the color samples 80 by a master instrument. According to various embodiments, the master instrument is selected as any one of the plurality of instruments $155_1$-$155_n$ against which the remaining instruments (the secondary instruments) are to be profiled. In certain embodiments, the master instrument may be selected such that it is close to the midpoint of the plurality of instruments $155_1$-$155_n$. For the sake of example, the master instrument is selected as instrument $155_1$ in FIG. 4b. The second set of spectral data may be communicated to the master profile generation module 170 via the communication link $205_1$, as shown in FIG. 4b.

At step 110 of FIG. 3 and as shown in FIG. 4b, the master profile generation module 170 receives the first set of spectral data (virtual standard data) from the first data storage module 165 and generates a profile for the master instrument $155_1$ based on a comparison of the first and second sets of spectral data. The master instrument profile may be generated in a manner analogous to that described above in connection with the profile generation module 60 of FIGS. 2a-2d and communicated to the second data storage module 175 for storage therein as the virtual master profile.

Figure 4C:
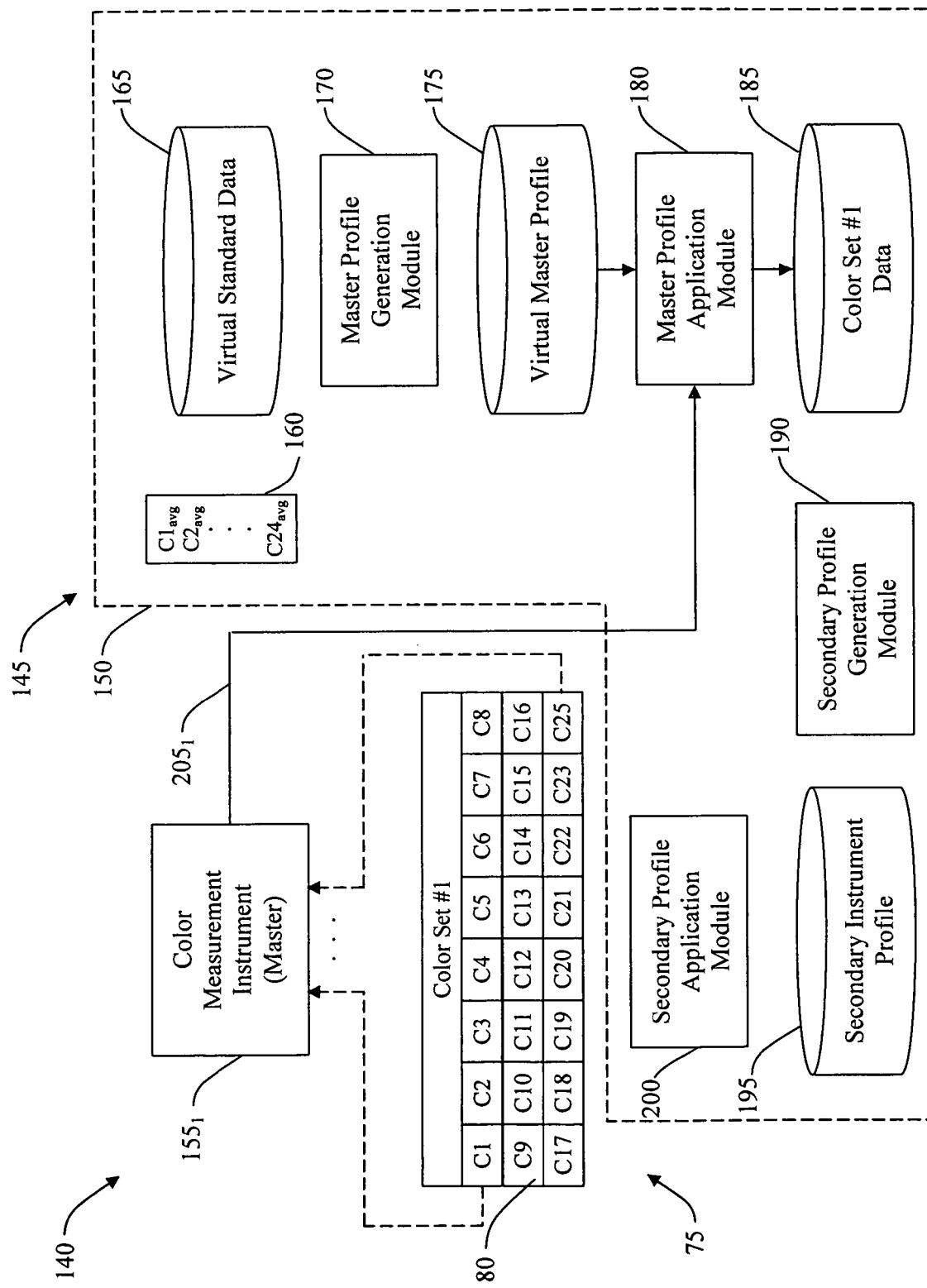

At step 115 of FIG. 3 and as shown in FIG. 4c, a third set of spectral data is collected based on color measurements of the color samples 80 by the master instrument $155_1$ and communicated to the master profile application module 180 via the communication link $205_1$.

At step 120 of FIG. 3 and as shown in FIG. 4c, the master profile application module 180 receives the virtual master profile from the second data storage module 175 and applies the profile to the third set of spectral data to generate a fourth set of adjusted spectral data in a manner analogous to that described above in connection with the profile application module 70 of FIGS. 2a-2d. The fourth set of spectral data is thus obtained by "self-profiling" the master instrument $155_1$. The fourth set of spectral data is communicated to the third data storage module 185 and stored therein as color set #1 data, as further shown in FIG. 4c.

At step 125 of FIG. 3, a fifth set of spectral data is collected based on color measurements of the color samples 80 by a secondary instrument. According to various embodiments, the secondary instrument may be selected as one of the plurality of instruments $155_1$-$155_n$ (excluding the master instrument $155_1$). For the sake of example, the secondary instrument is selected as instrument $155_2$ in FIG. 4d. The fifth set of spectral data is communicated to the second profile application module 190 via the communication link $205_2$ as further shown in FIG. 4d.

Figure 4D:
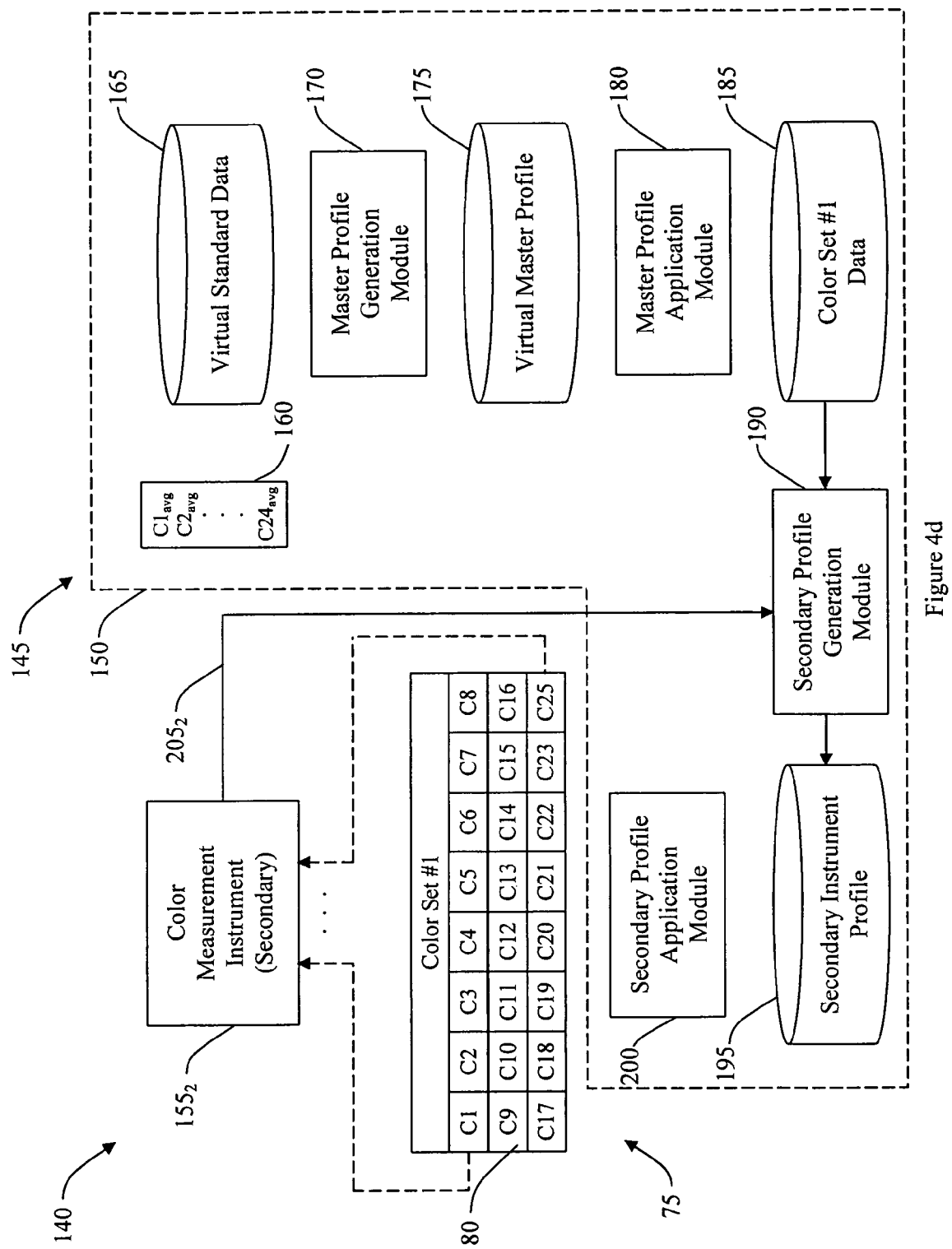

At step 130 of FIG. 3 and as shown in FIG. 4d, the secondary profile generation module 190 receives the fourth set of spectral data (color set #1 data) from the third data storage module 185 and generates a profile for the secondary instrument $155_2$ based on a comparison of the fourth and fifth sets of spectral data. The secondary instrument profile may be generated in a manner analogous to that of the virtual master profile and communicated to the fourth data storage module 195.

Figure 4E:
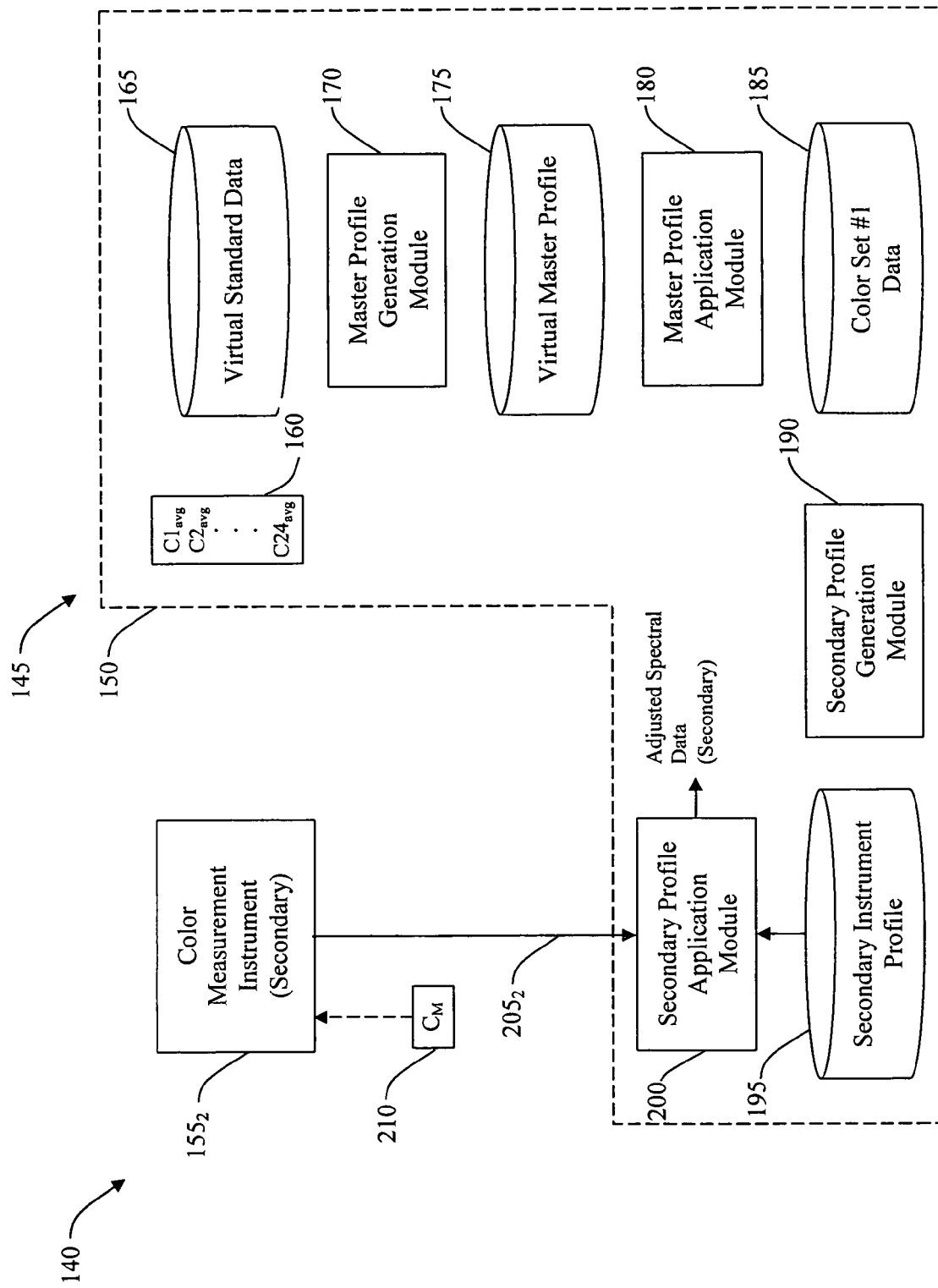

At step 135 of FIG. 3 and as shown in FIG. 4e, a sixth set of spectral data is collected based on a color measurement of a color sample 95 ($C_M$) by the secondary instrument $155_2$. The sixth set of spectral data may be collected, for example, during normal use of the secondary instrument $155_2$. As further shown in FIG. 4e, the sixth set of spectral data may be communicated to the secondary profile application module 200 via the communication link $205_2$.

At step 137 of FIG. 3 and as shown in FIG. 4e, the secondary profile application module 200 receives the secondary instrument profile from the fourth data storage module 195 and applies the profile to the sixth set of spectral data to generate an adjusted set of spectral data in a manner analogous to that of the first application profile module 180. The resulting adjusted reflectance values may then be mapped onto a suitable color scale such as, for example, a CIELAB color scale, and then output by the computing device 150.

Although the above-described embodiments illustrate the generation and application of a secondary instrument profile for one color set 75 and one secondary instrument, it will be appreciated that other in other embodiments the methods of FIGS. 1-2 and the systems 30, 140 of FIGS. 2a-d and FIGS. 4a-e may include any number of different color sets 75 and any number of secondary instruments. For each color set 75, spectral data collected by a master instrument may be communicated to a corresponding data storage module within the computing device. Secondary instrument profiles based on one or more the color sets may thus be generated, stored, and selectively applied to spectral data collected by one or more of the secondary instruments. Accordingly, when a secondary instrument is to be used for measuring a color sample physically similar to a particular color set 75 (e.g., a textile color set), the secondary instrument profile corresponding to the color set 75 may be selectively applied for adjusting the spectral data.

Additionally, although the computer systems 35, 145 are shown as comprising a single computing device, it will be appreciated that the computer systems 35, 145 may generally comprise any number of computing devices communicatively coupled and distributed across one or more locations. According to various embodiments, for example, the computer systems 135, 145 may comprise a plurality of computing devices distributed across a corresponding plurality of locations of a business enterprise. In such embodiments, spectral data for each color set 75 may be collected by a master instrument and stored within a computing device at a first location. The spectral data may then be accessed by a computing device at a second location where secondary instrument profiles are to be generated. Communication between the computing devices may be performed using any suitable data communication network, such as, for example, the Internet. Accordingly, the master instrument and the secondary instruments need not physically reside at the same location. In such embodiments, it should be noted that because the generation of a secondary instrument profile requires the use of the corresponding color set 75, the color sets 75 must be physically transported to those locations where corresponding secondary instrument profiles are to be generated.

It will further be appreciated that although the above-described embodiments are application-based and require the secondary instruments to be connected with a computing device for applying a secondary instrument profile, other embodiments may be configured such that the secondary instruments may be operated in a stand-alone mode. According to such embodiments, for example, the secondary instruments may include data storage and processing capabilities for storing and applying one or more profiles independent from a computing device.

It will further be appreciated that each computing device may be implemented using one or more networked servers such that the computing devices are remotely accessible by the master and secondary instruments. According to such embodiments, for example, processes performed by the computing devices may be provided as web-based services via the Internet.

Figure 5:
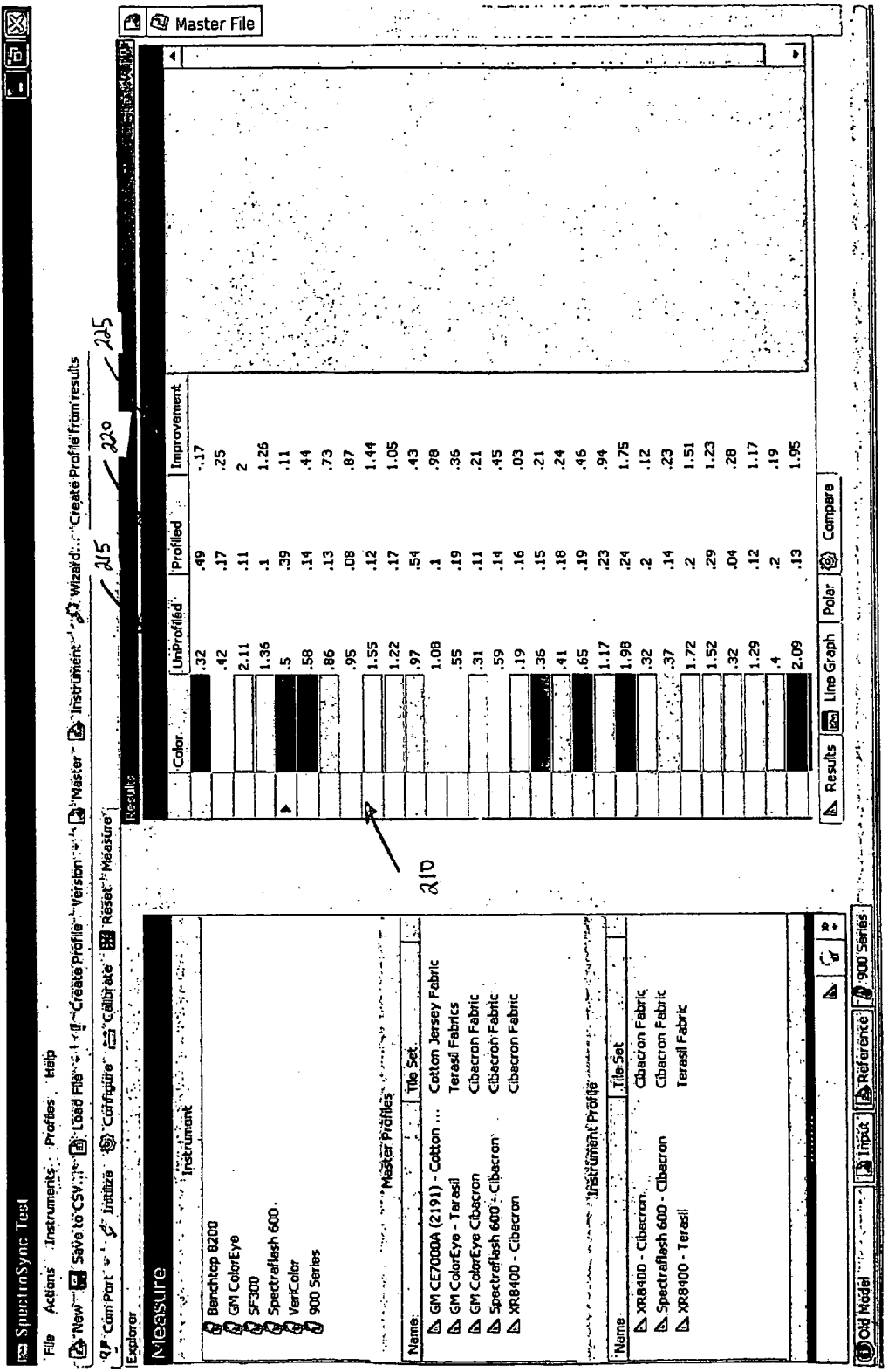
FIG. 5 is a computer screen shot of an example of a color set and a master profile generated using two different color measurement instruments.

FIG. 5 is a computer screen shot providing an example of a color set and a master profile created from two different instruments manufactured by different vendors. Specifically, the master instrument is a Model Spectraflash 600 sold by Datacolor, Incorporated of Lawrenceville, N.J., and the secondary instrument is a Model XR8400 sold by X-Rite, Incorporated of Grandville, Mich. Without using the spectral data adjustment methodologies of the present invention, the delta E difference between the two instruments is reflected in column 215 for each color 210. The delta E difference between the two measurements using the profiling methodology of the present invention is illustrated in column 220. The numerical difference between the delta E values in columns 215 and 220 is shown in column 225. The data indicates that the improvement with the present invention is dramatic.

Figure 6:
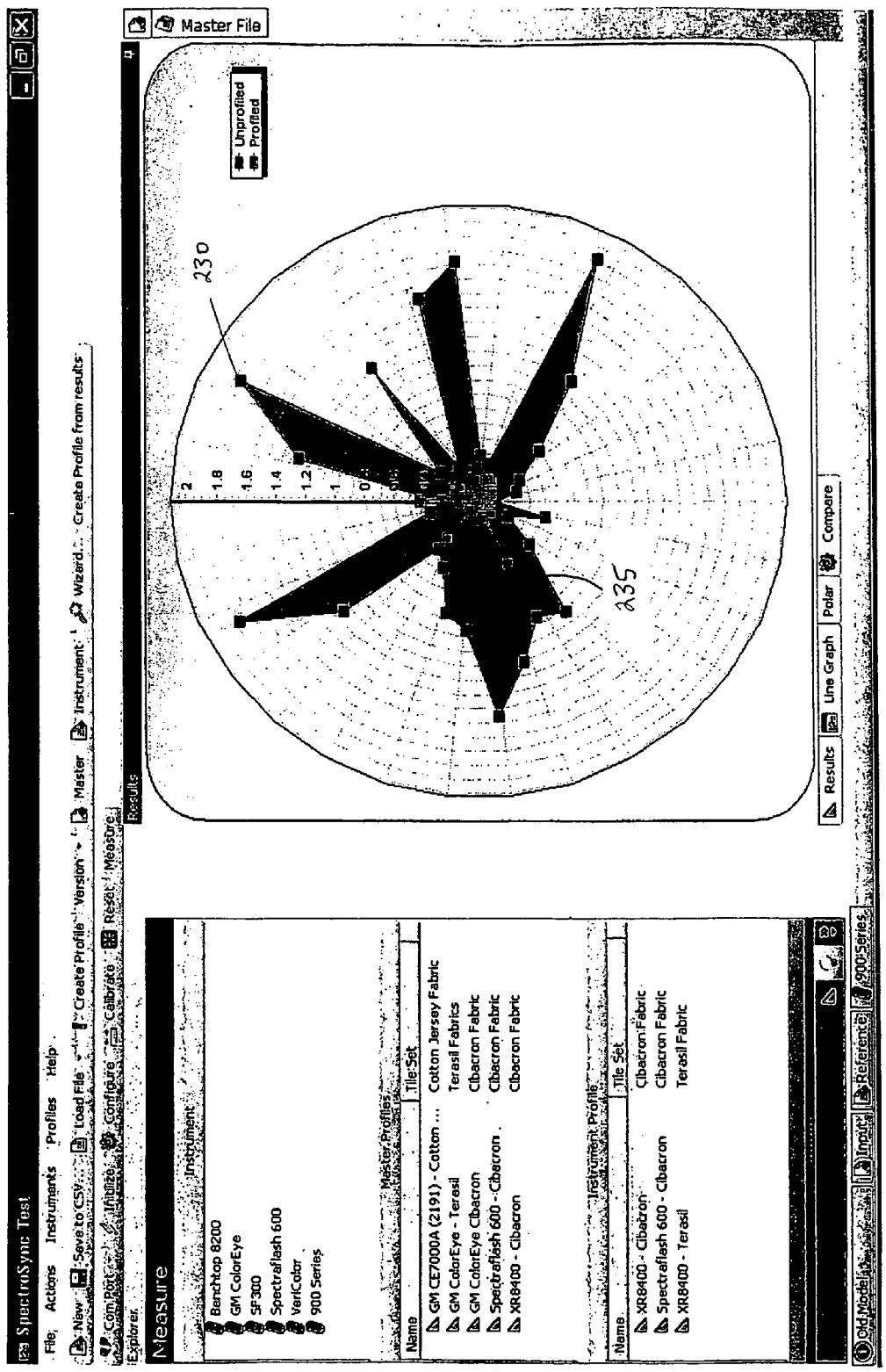
FIG. 6 is a computer screen shot of an example of unprofiled and profiled data points for the two different color measurement instruments of FIG. 5.

FIG. 6 is a computer screen shot providing a graphic representation of the difference between the unprofiled and profiled data. The unprofiled data points for the various colors are illustrated with red squares 230 and the profiled data points are illustrated by the green squares 235.

Figure 7:
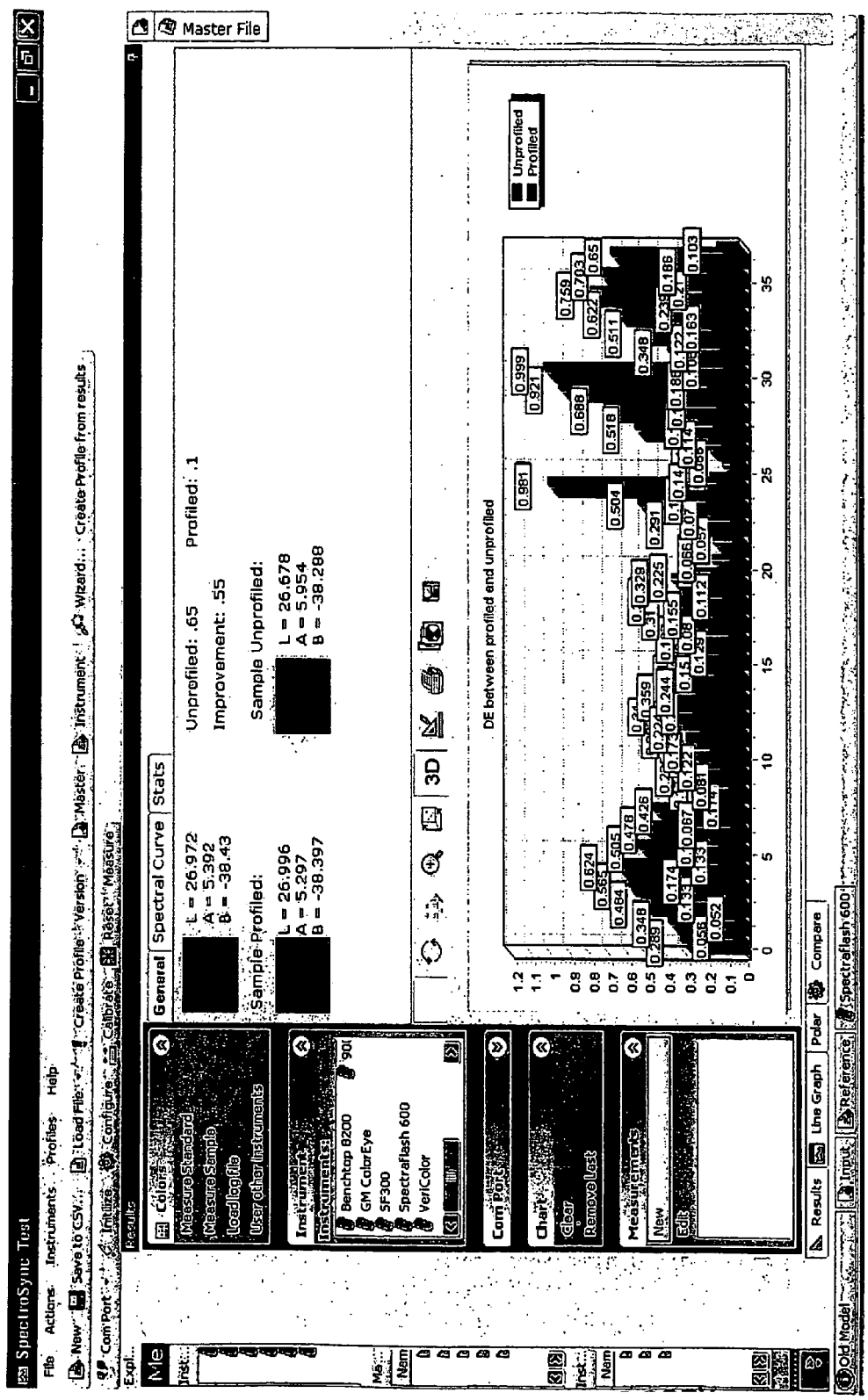
FIG. 7 is a computer screen shot of samples measured using the master color measurement instrument and the secondary color measurement instrument.

FIG. 7 is a computer screen shot showing the difference between the unprofiled Delta E and the profiled Delta E of measured colors that were not part of the profiled color set. Again, the improvement in inter-instrument agreement is shown to be substantial.

Whereas particular embodiments of the invention have been described herein for the purpose of illustrating the invention and not for the purpose of limiting the same, it will be appreciated by those of ordinary skill in the art that numerous variations of the details, materials, configurations and arrangement of components may be made within the principle and scope of the invention without departing from the spirit of the invention. The preceding description, therefore, is not meant to limit the scope of the invention.

What is claimed is:

1. A method for adjusting a color measurement of a secondary color measurement instrument, the method comprising:
generating a profile for the secondary color measurement instrument based on color measurements of a master color measurement instrument; and
applying the profile to adjust the color measurement of the secondary color measurement instrument;
wherein, generating a profile for the secondary color measurement instrument includes:
a) generating a first set of spectral data based on color measurements of a set of colors by a plurality of color measurement instruments;
(b) collecting a second set of spectral data based on color measurements of the set of colors by the master color measurement instrument, wherein the master color measurement instrument is one of the plurality of color measurement instruments;
(c) generating a profile for the master color measurement instrument based on a comparison of the first and second sets of spectral data;
(d) collecting a third set of spectral data based on color measurements of the set of colors by the master color measurement instrument;
(e) generating a fourth set of spectral data based on an application of the master color instrument profile to the third set of spectral data;
(f) collecting a fifth set of spectral data based on color measurements of the set of colors by the secondary color measurement instrument; and
(g) comparing the fourth and fifth sets of spectral data.

2. The method of claim 1, wherein applying the profile to adjust the color measurement of the secondary color measurement instrument includes applying the profile to compensate for at least one spectral difference between the master color measurement instrument and the secondary color measurement instrument.

3. The method of claim 1, wherein generating a first set of spectral data includes averaging the color measurements of the plurality of color measurement instrument.

4. The method of claim 1 wherein comparing the fourth and fifth sets of spectral data includes applying a regression to the fourth and fifth sets of spectral data to determine terms of a multiple-term mathematical formula.

5. A system for adjusting a color measurement of a secondary color measurement instrument, the system comprising:
a secondary profile generation module for generating a profile for the secondary color measurement instrument based on color measurements of a master color measurement instrument; and
a secondary profile application module for applying the secondary instrument profile to adjust the color measurement of the secondary color measurement instrument;
wherein, generating a profile for the secondary color measurement instrument includes:
(a) generating a first set of spectral data based on color measurements of a set of colors by a plurality of color measurement instruments;
(b) collecting a second set of spectral data based on color measurements of the set of colors by the master color measurement instrument, wherein the master color measurement instrument is one of the plurality of color measurement instruments;
(c) generating a profile for the master color measurement instrument based on a comparison of the first and second sets of data;
(d) collecting a third set of spectral data based on color measurements of the set of colors by the master color measurement instrument;
(e) generating a fourth set of spectral data based on an application of the master color instrument profile to the third set of spectral data;
(f) collecting a fifth set of spectral data based on color measurements of the set of colors by the secondary color measurement instrument; and
comparing the fourth and fifth sets of spectral data.

6. The system of claim 5 wherein the secondary profile generation module compares the fourth and fifth sets of spectral data by applying a regression to the spectral data to determine terms of a multiple-term mathematical formula.

7. The system of claim 5 further comprising:
a master profile generation module for generating a profile for the master color measurement instrument based on color measurements of the master color measurement instrument; and
a master profile application module for applying the master color instrument profile to the color measurements of the master color measurement instrument to generate a portion of the spectral data received by the secondary profile generation module.

8. The system of claim 5 wherein the secondary profile application module is further for applying the profile to adjust the color measurement of the secondary color measurement instrument such that at least one spectral difference between the master color measurement instrument and the secondary color measurement instrument is compensated.

9. The system of claim 5 wherein the master color measurement instrument has a measurement geometry similar to a measurement geometry of the secondary color measurement instrument.

10. The system of claim 5 wherein the master color measurement instrument has a measurement geometry dissimilar to measurement geometry of the secondary color measurement instrument.

11. A computer readable medium having stored thereon instructions which, when executed by a processor, cause the processor to:
generate a profile for a secondary color measurement instrument based on color measurements of a master color measurement instrument; and
apply the profile to adjust the color measurement of the secondary color measurement instrument;
wherein, the instructions for causing the processor to generate a profile for a secondary color measurement instrument include instructions which, when executed by a processor, cause the processor to:
(a) generate a first set of spectral data based on color measurements of a set of colors by a plurality of color measurement instruments;
(b) collect a second set of spectral data based on color measurements of the set of colors by the master color measurement instrument, wherein the master color measurement instrument is one of the plurality of color measurement instruments;
(c) generate a profile for the master color measurement instrument based on a comparison of the first and second sets of data;

(d) collect a third set of spectral data based on color measurements of the set of colors by the master color measurement instrument;

(e) generate a fourth set of spectral data based on an application of the master color instrument profile to the third set of spectral data;

(f) collect a fifth set of spectral data based on color measurements of the set of colors by the secondary color measurement instrument; and (g) compare the fourth and fifth sets of spectral data.

12. The computer readable medium of claim 11 wherein the instructions for causing the processor to apply the profile further cause the processor to compensate for at least one spectral difference between the master color measurement instrument and the secondary color measurement instrument.

13. The computer readable medium of claim 11 wherein the instructions for causing the processor to generate a first set of spectral data further cause the processor to average the color measurements of the plurality of color measurement instrument.

14. The computer readable medium of claim 11 wherein the instructions for causing the processor to compare the fourth and fifth sets of spectral data further cause the processor to apply a regression to the fourth and fifth sets of spectral data to determine terms of a multiple-term mathematical formula.

* * * * *